US012525418B2

(12) United States Patent
Strahan et al.

(10) Patent No.: US 12,525,418 B2
(45) Date of Patent: Jan. 13, 2026

(54) COMPOSITE ELECTRON BEAM VACUUM TUBE

(71) Applicant: The Boeing Company, Arlington, VA (US)

(72) Inventors: Michael K. Strahan, Ogden, UT (US); Kyle Eversole, Ogden, UT (US)

(73) Assignee: The Boeing Company, Arlington, VA (US)

(*) Notice: Subject to any disclaimer, the term of this patent is extended or adjusted under 35 U.S.C. 154(b) by 318 days.

(21) Appl. No.: 18/183,338

(22) Filed: Mar. 14, 2023

(65) Prior Publication Data

US 2024/0312754 A1 Sep. 19, 2024

(51) Int. Cl.

*H01J 35/06* (2006.01)
*H01J 19/44* (2006.01)
*H01J 23/07* (2006.01)

(52) U.S. Cl.

CPC .............. *H01J 35/06* (2013.01); *H01J 19/44* (2013.01); *H01J 23/07* (2013.01)

(58) Field of Classification Search

CPC ............. H01J 35/06; H01J 19/44; H01J 23/07
See application file for complete search history.

(56) References Cited

U.S. PATENT DOCUMENTS

| | | | | |
|---|---|---|---|---|
| 2,356,645 A * | 8/1944 | Atlee | H05G 1/06 | 378/143 |
| 2,923,824 A * | 2/1960 | Martin | G01V 5/08 | 250/269.1 |
| 5,007,373 A * | 4/1991 | Legg | C23C 16/503 | 315/111.21 |
| 5,970,117 A * | 10/1999 | Basinger | H01J 35/06 | 378/121 |
| 2003/0179854 A1* | 9/2003 | Jaafar | H01J 35/32 | 378/119 |
| 2010/0065751 A1* | 3/2010 | Harra | A61B 5/14532 | 250/393 |

FOREIGN PATENT DOCUMENTS

DE 102017202942 A1 * 8/2018 ....... H01H 33/66207

* cited by examiner

*Primary Examiner* — Abdulmajeed Aziz
*Assistant Examiner* — Nathaniel J Lee
(74) *Attorney, Agent, or Firm* — Yee & Associates, P.C.

(57) ABSTRACT

An electron beam vacuum tube assembly is provides. The electron beam vacuum tube assembly comprises an anode assembly and a cathode assembly. A composite insulator tube provides electrical isolation between the anode assembly and cathode assembly, wherein the anode assembly, cathode assembly, and composite insulator are detachably connected each other.

20 Claims, 6 Drawing Sheets

COMPOSITE ELECTRON BEAM VACUUM TUBE

BACKGROUND INFORMATION

1. Field

The present disclosure relates generally to electron beam vacuum tubes, and more specifically for a serviceable, composite electron beam vacuum tube for a Febetron 705.

2. Background

The Febetron 705 is a flash X-ray machine developed over 50 years ago and is no longer supported by the manufacturer. The electron beam (E-Beam) tube originally designed by the original equipment manufacturer (OEM) is a large, sealed, glass, ultra-high vacuum (UHV) tube.

Recent attempts at reproducing the glass vacuum tubes by the company currently supporting the Febetron 705 have failed, which has caused them to declare the E-Beam tube as discontinued and not supportable.

Therefore, it would be desirable to have a method and apparatus that take into account at least some of the issues discussed above, as well as other possible issues.

SUMMARY

An illustrative embodiment provides an electron beam vacuum tube assembly. The electron beam vacuum tube assembly comprises an anode assembly and a cathode assembly. A composite insulator tube provides electrical isolation between the anode assembly and cathode assembly, wherein the anode assembly, cathode assembly, and composite insulator are detachably connected each other.

Another illustrative embodiment provides an electron beam vacuum tube assembly for a Febetron 705 electron accelerator. The electron beam vacuum tube assembly comprises a composite insulator tube made of Rexolite® 1422, an anode assembly detachably connect to a first end of the composite insulator tube, and a cathode assembly detachably connected at a second end of the composite insulator tube. The composite insulator tube provides electrical isolation between the anode assembly and cathode assembly.

Another illustrative embodiment provides an electron beam vacuum tube assembly for a Febetron 705 electron accelerator. The electron beam vacuum tube assembly comprises a composite insulator tube made of Rexolite® 1422. An anode assembly is detachably connected to a first end of the composite insulator tube. The anode assembly comprises an O-ring electron beam exit window frame, a titanium window, a vacuum port assembly, and an anode interface plate. A cathode assembly detachably is connected at a second end of the composite insulator tube via an electrode holder. The cathode assembly comprises an adjustable cathode rod configured to adjust the anode/cathode gap, a changeable cathode tip, and a coupler. The composite insulator tube provides electrical isolation of up to 2.5 MeV between the anode assembly and cathode assembly. The composite insulator tube also maintains a ~$1e^{-6}$ torr ultra-high vacuum environment inside the electron beam vacuum tube assembly.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account that the Febetron 705 is a flash X-ray machine developed over 50 years ago and is no longer supported by the manufacturer. The electron beam (E-beam) tube originally designed by the original equipment manufacturer (OEM) is a large, sealed, glass, ultra-high vacuum (UHV) tube.

The illustrative embodiments also recognize and take into account that recent attempts at reproducing the glass vacuum tubes by the companying currently supporting the Febetron 705 have failed, which has caused them to declare the E-beam tube as discontinued and not supportable. Among other problems, the artistry required to make the large, glass vacuum chamber, specifically the glass-to-metal seals, has been lost.

The illustrative embodiments provide a complete replacement E-beam tube UHV assembly that can be manufactured using currently available manufacturing techniques and materials. In addition, the E-Beam tube of the illustrative embodiments can be disassembled, cleaned, and repaired, thereby providing a long-term, low cost, sustainable system.

Figure 1:
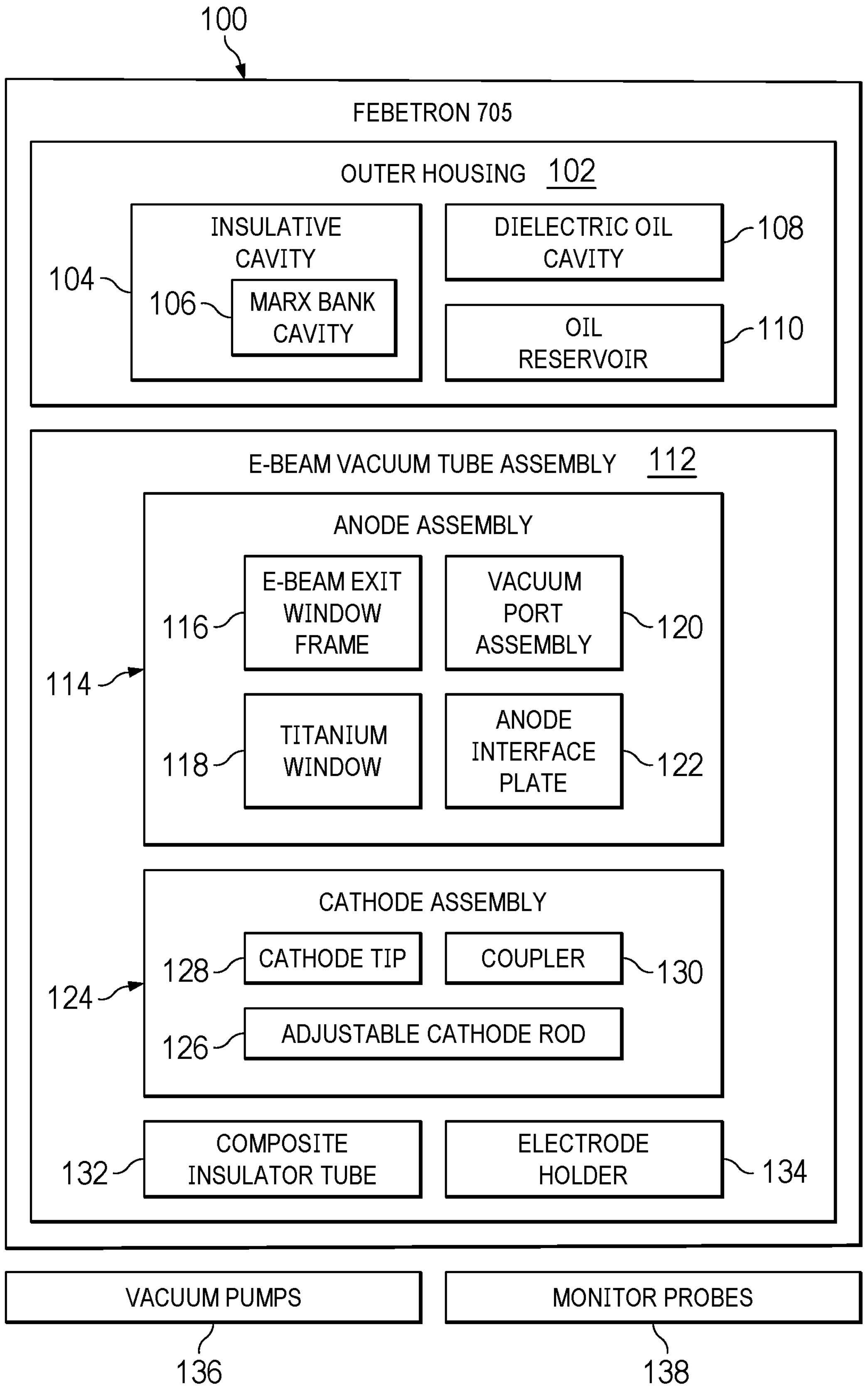
FIG. 1 depicts a block diagram of Febetron 705 electron accelerator incorporating a composite E-beam vacuum in accordance with an illustrative embodiment.

FIG. 1 depicts a block diagram of Febetron 705 electron accelerator incorporating a composite E-beam vacuum in accordance with an illustrative embodiment. Febetron 705 100 comprises an outer housing 102. Within the outer housing 102 is an insulative cavity 104 surrounding a Marx bank cavity 106.

In the front of the outer housing 102 is a dielectric oil cavity 108, which is supplied by an oil reservoir 110.

Inserting into the front of the Febetron 705 100 is an E-beam vacuum tube assembly 112. E-beam vacuum tube assembly 114 comprises an anode assembly 114, cathode assembly 124, and composite insulator tube 132.

The anode assembly 114 comprises an E-beam exit window frame 116, a titanium window 118, a vacuum port assembly 120, and an anode interface plate 122 that couples to the outer housing 102 of the Febetron 705 100.

The cathode assembly 124 comprises an adjustable cathode rod 126, a cathode tip 128, and a coupler 130 that connects the cathode tip 128 to the adjustable cathode rod 126.

An electrode holder 134 is located at the opposite end of the composite insulator tube 132 from the anode assembly 114.

A number of vacuum pumps can be connected to the vacuum port assembly 120 to create a UHV environment inside the E-beam vacuum tube assembly 112. A number of monitor probes 138 can also be connected to the vacuum port assembly 120 to monitor the activity of the E-beam as it passes through the titanium window 118 and E-beam exit window frame 116.

Figure 2:
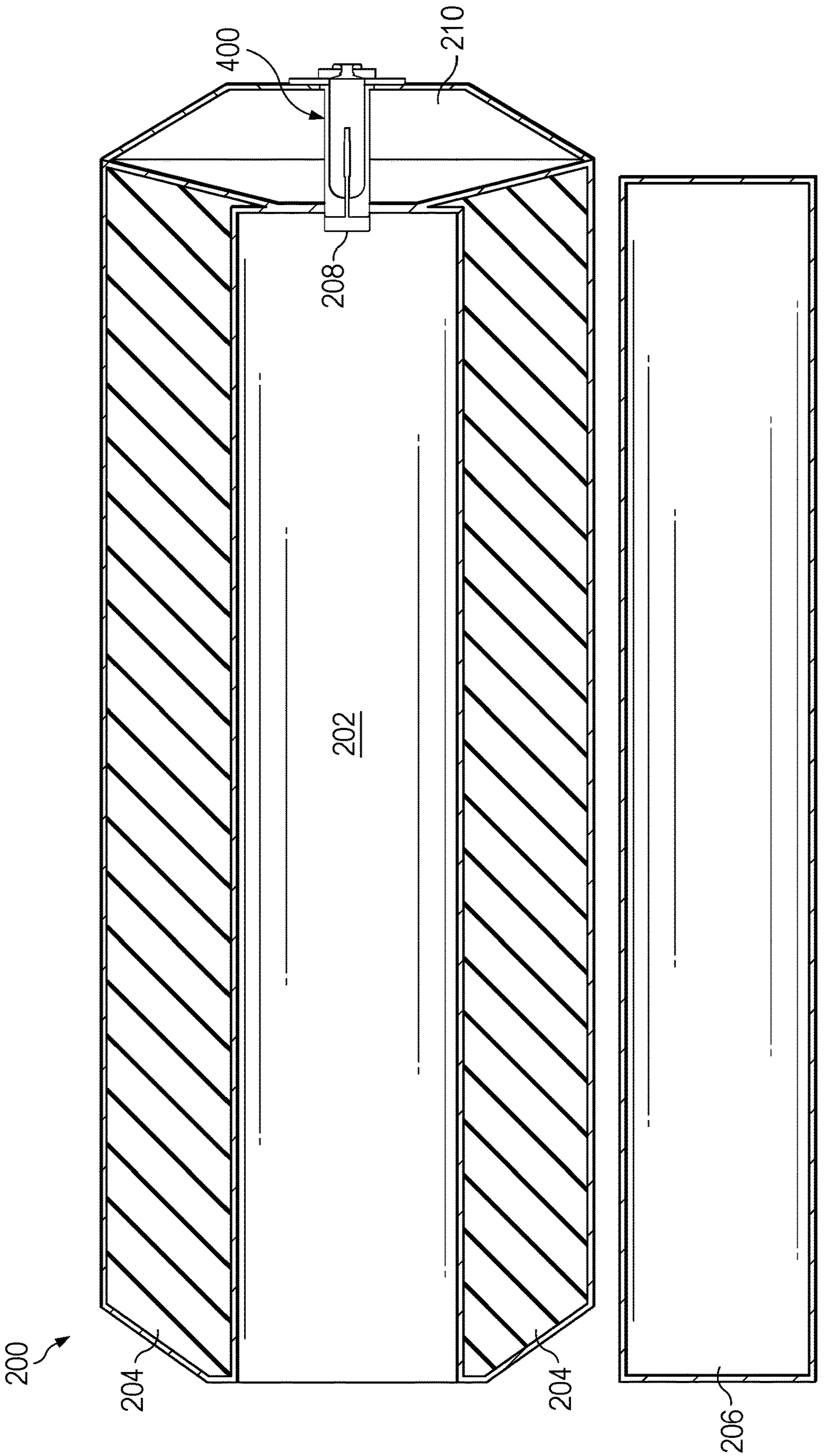
FIG. 2 depicts a pictorial side cross-section view of a Febetron 705 electron accelerator in which the illustrative embodiments can be employed.

FIG. 2 depicts a side cross-section pictorial illustration of a Febetron 705 electron accelerator in which the illustrative embodiments can be employed. Febetron 705 200 is an example of Febetron 705 100 in FIG. 1. As shown in the example, Febetron 705 200 comprises a Marx Bank cavity 202 surrounded by a sulfur hexafluoride (SF6) insulative cavity 204. Marx bank cavity 202. A Marx bank comprises a number of Marx generators that generate high-voltage pulses from a low-voltage direct current (DC) supply.

Below SF6 cavity 204 is an oil reservoir 206, which provides oil for a dielectric oil cavity 210 at the front of Febetron 705 200.

Inserted into the front of the Febetron 705 200 is an E-beam tube assembly 400. E-beam tube assembly 400 interacts with the Marx bank cavity 202 through a tube interface 208.

Figure 3:
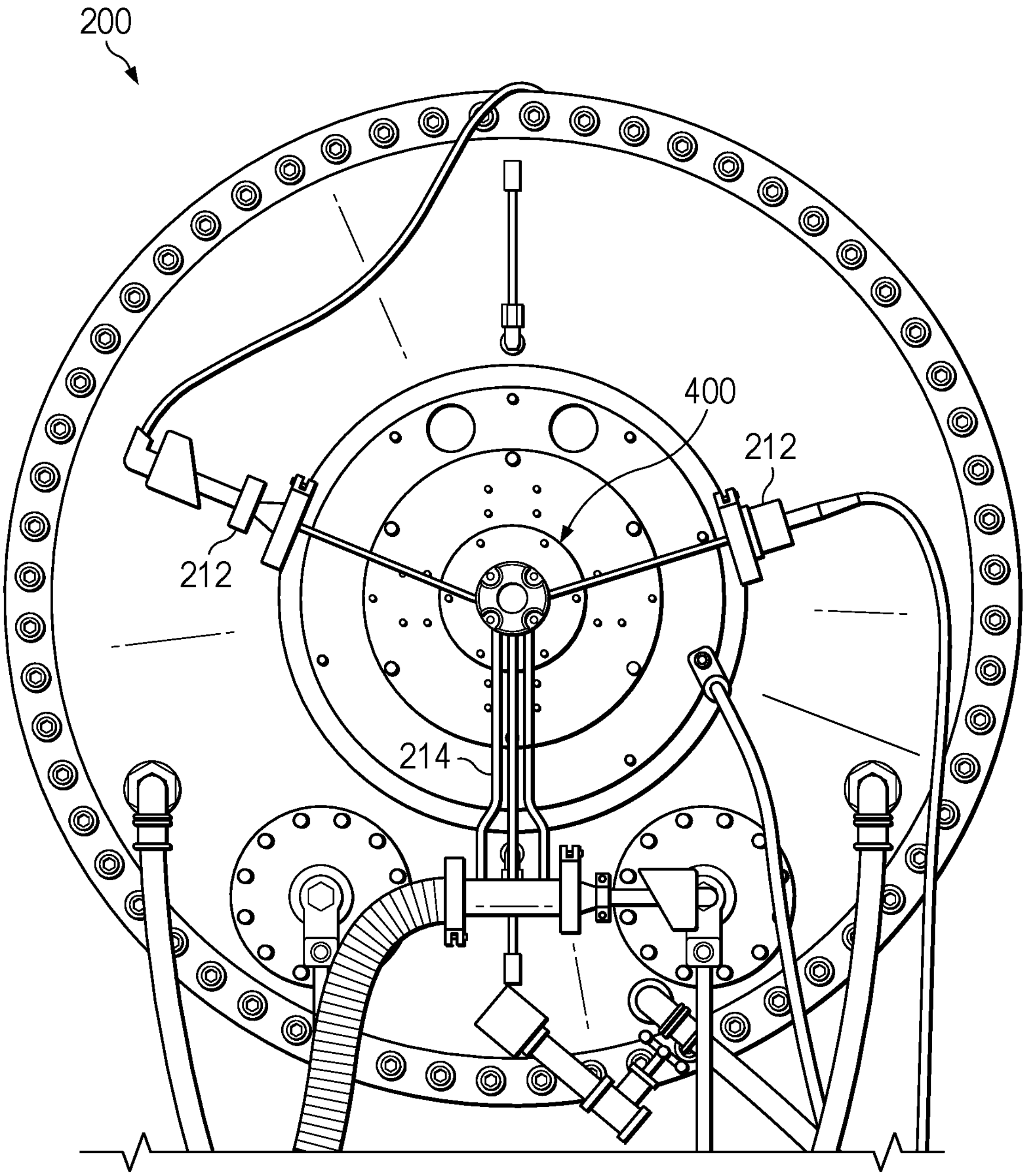
FIG. 3 (PRIOR ART)
FIG. 3 depicts a front view pictorial illustration of a Febetron 705 electron accelerator in which the illustrative embodiments can be employed.

FIG. 3 depicts a front view pictorial illustration of the Febetron 705 200. This view shows the E-beam tube assembly 400 inserted into the front of Febetron 705 200 outer housing. A number of monitor probes 212 and UHV vacuum pumps 214 connect to the front of the E-beam tube assembly 400.

Figure 4:
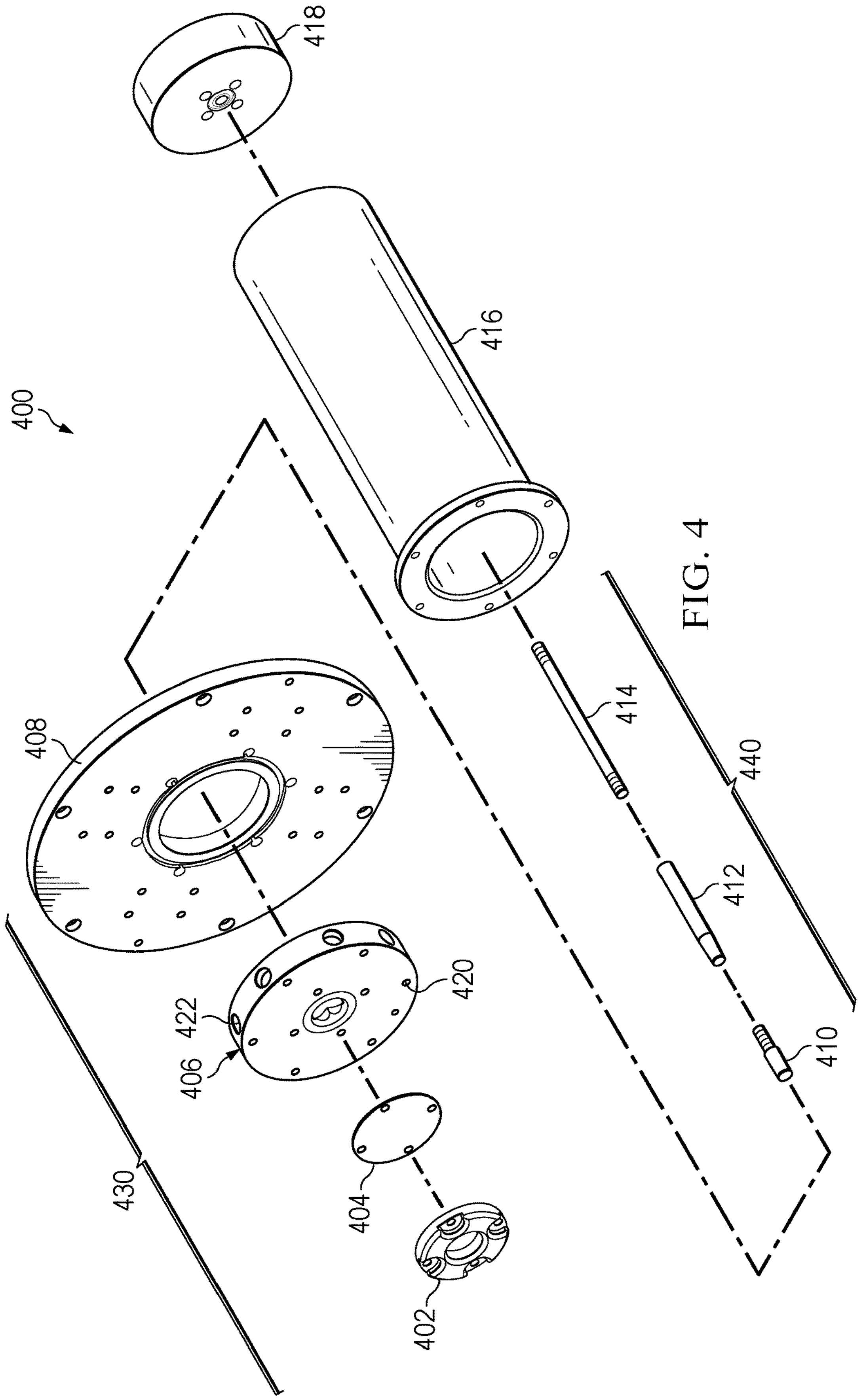
FIG. 4 an exploded perspective view pictorial illustration of a composite E-beam vacuum tube assembly in accordance with an illustrative embodiment.
Figure 5:
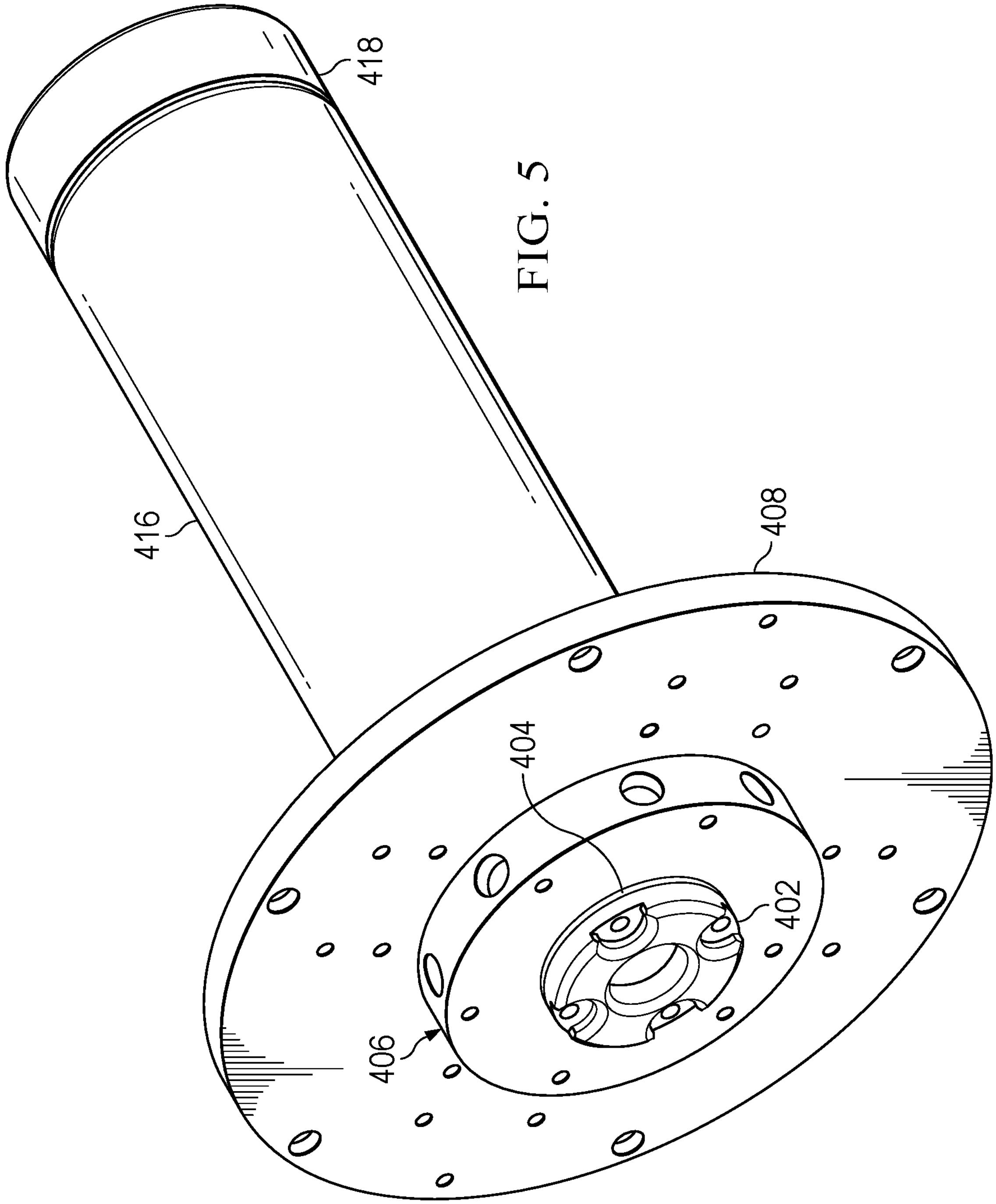
FIG. 5 depicts perspective view pictorial illustration of an assembled composite E-beam vacuum tube assembly in accordance with an illustrative embodiment.
Figure 6:
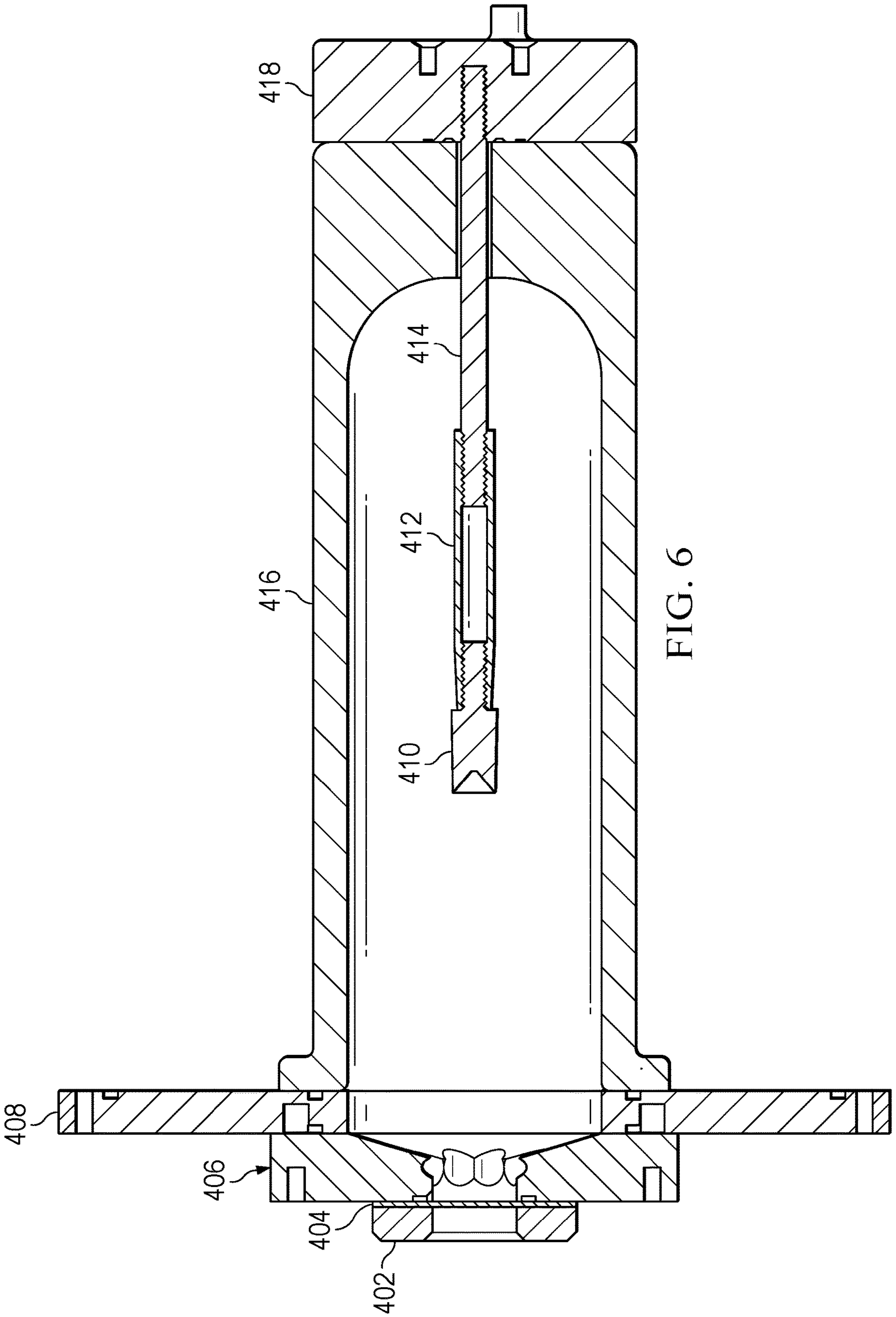
FIG. 6 depicts a side cross-section view of a composite E-beam vacuum tube assembly in accordance with an illustrative embodiment.

FIG. 4 an exploded perspective view pictorial illustration of a composite E-beam vacuum tube assembly in accordance with an illustrative embodiment. FIG. 5 depicts the assembled composite E-beam vacuum tube assembly. FIG. 6 depicts a side cross-section view of the composite E-beam vacuum tube assembly. E-beam vacuum tube assembly 400 is an example implementation of E-beam vacuum tube assembly 112 in FIG. 1.

The E-beam vacuum tube assembly 400 is configured to replace the large, glass vacuum chamber of the original Febetron 705 OEM E-beam tube with an easily machinable, composite material that can be manufactured in most machine shops. The OEM E-beam tube was sealed and thus not repairable. In contrast, the E-beam tube of the illustrative embodiments can be disassembled and serviced, requiring only a UHV vacuum pump. Furthermore, the OEM E-beam tube design did not provide adjustability of the anode/cathode gap. In contrast, the anode/cathode gap of the illustrative embodiments is adjustable.

The E-beam vacuum tube comprises three main parts. The first main component is the anode assembly 430, which comprises an E-beam O-ring exit window frame 402, a vacuum port assembly 406, and an anode interface plate 408 for the Febetron 705. The E-beam O-ring exit window frame 402 is reusable and provides a vacuum seal for a thin titanium window 404 that provides a transition point for accelerated electrons to move from a UHV inside tube 416 to atmosphere. The vacuum port assembly 406 is located on the UHV side of the E-beam O-ring exit window frame 402 and provides ports 420 for attaching UHV vacuum pumps and ports 422 for attaching monitor probes. The anode interface plate 408 connects the anode assembly 430 to the Febetron 705 outer housing and the composite insulator tube 416.

The second main component of the E-beam tube is the composite insulator tube 416, which provides a 2.5 MeV electrical isolation between the anode and the cathode. The composite insulator is also the main separation surface between atmosphere and the UHV. The composite insulator 416 is required to hold off 2.5 MeV between the cathode and the outer housing of the Febetron 705 while maintaining tube impedance and ~$1e^{-6}$ torr UHV environment inside the electron beam vacuum tube assembly 400 between the anode assembly 430 and cathode assembly 440. The composite insulator 416 can be made of a polystyrene plastic. In an embodiment, composite insulator 416 is made of Rexolite® 1422. The dielectric properties of Rexolite® 1422 are tuned for the Febetron 705.

The third main component of the E-beam tube is the cathode assembly 440, which provides the interface to the Febetron 705 Marx Multiplier output. The cathode assembly 440 comprises an adjustable cathode rod 414 and tip assembly comprising a cathode tip 410 and coupler 412 that connects the cathode tip 410 to the adjustable cathode rod 414. The adjustable cathode rod 414 is configured to be able to adjust the anode/cathode (AK) gap in the E-beam vacuum tube assembly 400.

In addition an adjustable AK gap, the material and geometry of the cathode tip 410 are changeable, allowing for the fine tuning of the end design for maximum performance. For example, cathode tip 410 can be made of tungsten or stainless steel. Cathode rod 414 is connected to an electrode holder 418 at the distal end of composite insulator tube 416 opposite the anode assembly 430. Electrode holder 418 connects to the tube interface 208 for the Marx bank in the Febetron 705 200.

The anode assembly 430, cathode assembly 440, and composite insulator tube 416 are detachably connected to each other. Because all components of the E-beam vacuum tube assembly 400 are serviceable, failures of any of the components do not require replacement of the entire E-beam tube assembly.

The E-beam vacuum tube assembly 400 has smooth transitions on external and internal geometries without sharp edges, which mitigates focal points for electron accumulation and arcing, thereby increasing the life span and integrity of the E-beam tube.

The E-beam tube Marx interface went through multiple iterations, the first iteration closely resembled the interface of the original tube, this was paired with the longer tube design. The tube design was shortened up to mitigate electron transference through the tube material instead of along the cathode, along with this tube alteration the Marx interface had to become longer to still provide sufficient connection to the Marx bank. With changing the geometry of the tube, the cathode rod was also put through multiple iterations of length and material. The cathode tip had multiple geometry designs to see which would have the most efficient electron transmission. Multiple tip designs include a cone shaped tip with a waffle pattern machined into the end, these pieces ranged in end diameter from 0.125" up to 0.5". In addition, the end design, which had an inverted cone shape into the end of the tip. The adjustability of the AK gap in the E-beam tube provides fine tuning capabilities to find the best location of the tip in relation to the focusing magnet of the machine. The most recent design of the cathode tip allows for a more efficient electron transmission from the cathode to the anode, maximizing output.

The front portion of the tube design went through multiple iterations to maximize volumetric flow for the vacuum pump as well as provide more reliable locations to measure the tube vacuum accurately. The front interface also went through multiple design iterations in regards to the exit window, changing the window interface to a reusable O-ring window frame design instead of the disposable copper gaskets. This change decreased the cost of running the machine as well as streamlined the process for switching out the exit window when necessary.

As used herein, “a number of” when used with reference to items, means one or more items. For example, “a number of different types of networks” is one or more different types of networks.

Further, the phrase “at least one of,” when used with a list of items, means different combinations of one or more of the listed items can be used, and only one of each item in the list may be needed. In other words, “at least one of” means any combination of items and number of items may be used from the list, but not all of the items in the list are required. The item can be a particular object, a thing, or a category.

For example, without limitation, “at least one of item A, item B, or item C” may include item A, item A and item B, or item B. This example also may include item A, item B, and item C or item B and item C. Of course, any combinations of these items can be present. In some illustrative examples, “at least one of” can be, for example, without limitation, two of item A; one of item B; and ten of item C; four of item B and seven of item C; or other suitable combinations.

When one component is “connected” to another component, the connection is a physical connection. For example, a first component can be considered to be physically connected to a second component by at least one of being secured to the second component, bonded to the second component, mounted to the second component, welded to the second component, fastened to the second component, or connected to the second component in some other suitable manner. The first component also can be connected to the second component using a third component. The first component can also be considered to be physically connected to the second component by being formed as part of the second component, an extension of the second component, or both.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms “includes”, “including”, “has”, “contains”, and variants thereof are used herein, such terms are intended to be inclusive in a manner similar to the term “comprises” as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An electron beam vacuum tube assembly, comprising:
- an anode assembly, wherein the anode assembly comprises an anode interface plate, a vacuum port assembly, and an exit window frame;
- a cathode assembly; and
- a composite insulator tube that provides electrical isolation between the anode assembly and the cathode assembly, wherein the anode assembly is detachably connected to a first end of the composite insulator tube and the cathode assembly is detachably connected to a second opposite end of the composite insulator tube.

2. The electron beam vacuum tube assembly of claim 1, wherein:
- the electron beam exit window frame is connected to the vacuum port assembly;
- the vacuum port assembly is connected to the anode interface plate; and
- the anode assembly is detachably connected to the first end of the composite insulator tube by the anode interface plate.

3. The electron beam vacuum tube assembly of claim 2, wherein the anode assembly further comprises a titanium window between the electron beam exit window frame and the vacuum port assembly.

4. The electron beam vacuum tube assembly of claim 2, wherein the electron beam exit window frame comprises a reusable O-ring.

5. The electron beam vacuum tube assembly of claim 2, wherein the vacuum port assembly comprises ports for attaching vacuum pumps and monitor probes.

6. The electron beam vacuum tube assembly of claim 1, wherein the cathode assembly comprises:
- an adjustable cathode rod configured to adjust an anode/cathode gap in the electron beam vacuum tube assembly; and
- a changeable cathode tip.

7. The electron beam vacuum tube assembly of claim 6, wherein the changeable cathode tip is made of tungsten or stainless steel.

8. The electron beam vacuum tube assembly of claim 1, wherein the composite insulator tube provides 2.5 MeV electrical isolation between the anode assembly and the cathode assembly.

9. The electron beam vacuum tube assembly of claim 1, wherein the composite insulator tube maintains a ~$1e^{-6}$ torr ultra-high vacuum environment inside the electron beam vacuum tube assembly between the anode assembly and the cathode assembly.

10. The electron beam vacuum tube assembly of claim 1, wherein the vacuum tube assembly is configured to operate in a Febetron 705 electron accelerator.

11. The electron beam vacuum tube assembly of claim 1, wherein the composite insulator tube is made of Rexolite® 1422.

12. An electron beam vacuum tube assembly for a Febetron 705 electron accelerator, the electron beam vacuum tube assembly comprising:
- a composite insulator tube made of Rexolite® 1422;
- an anode assembly detachably connected to a first end of the composite insulator tube, wherein the anode assembly comprises an anode interface plate, a vacuum port assembly, and an exit window frame; and a cathode assembly detachably connected at a second opposite end of the composite insulator tube, wherein the composite insulator tube provides electrical isolation between the anode assembly and the cathode assembly.

13. The electron beam vacuum tube assembly of claim 12, wherein the cathode assembly is connected to an electrode holder.

14. The electron beam vacuum tube assembly of claim 12, wherein:

the electron beam exit window frame is connected to the vacuum port assembly;

the vacuum port assembly is connected to the anode interface plate; and the anode assembly is detachably connected to the first end of the composite insulator tube by the anode interface plate.

15. The electron beam vacuum tube assembly of claim 14, further comprising a number of vacuum pumps connected to the vacuum port assembly.

16. The electron beam vacuum tube assembly of claim 14, further comprising a number of monitor probes connected to the vacuum port assembly.

17. The electron beam vacuum tube assembly of claim 12, wherein the cathode assembly comprises:

an adjustable cathode rod configured to adjust an anode/cathode gap in the electron beam vacuum tube assembly;

a changeable cathode tip; and a coupler that connects the changeable cathode tip to the adjustable cathode rod.

18. The electron beam vacuum tube assembly of claim 17, wherein the changeable cathode tip is made of tungsten or stainless steel.

19. The electron beam vacuum tube assembly of claim 12, wherein the composite insulator tube maintains a ~$1e^{-6}$ torr ultra-high vacuum environment inside the electron beam vacuum tube assembly between the anode assembly and the cathode assembly.

20. An electron beam vacuum tube assembly for a Febetron 705 electron accelerator, the electron beam vacuum tube assembly comprising:

a composite insulator tube made of Rexolite® 1422;

an anode assembly detachably connected to a first end of the composite insulator tube, wherein the anode assembly comprises an O-ring electron beam exit window frame, a titanium window, a vacuum port assembly, and an anode interface plate, and wherein the anode assembly is detachably connected to the first end of the composite insulator tube by the anode interface plate; and a cathode assembly detachably connected at a second opposite end of the composite insulator tube via an electrode holder, wherein the cathode assembly comprises an adjustable cathode rod configured to adjust an anode/cathode gap, a changeable cathode tip, and a coupler, wherein the composite insulator tube provides electrical isolation of up to 2.5 MeV between the anode assembly and cathode assembly, and wherein the composite insulator tube maintains a ~$1e^{-6}$ torr ultra-high vacuum environment inside the electron beam vacuum tube assembly.

* * * * *